(12) United States Patent
Goldberg

(10) Patent No.: US 6,668,251 B1
(45) Date of Patent: Dec. 23, 2003

(54) RENDERING DISCRIMINATOR MEMBERS FROM AN INITIAL SET OF RESULT DATA

(75) Inventor: Jonathan M. Goldberg, San Francisco, CA (US)

(73) Assignee: Tacit Knowledge Systems, Inc., Palo Alto, CA (US)

( * ) Notice: Subject to any disclaimer, the term of this patent is extended or adjusted under 35 U.S.C. 154(b) by 412 days.

(21) Appl. No.: 09/704,423

(22) Filed: Nov. 1, 2000

(51) Int. Cl.[7] .............................................. G06F 17/30
(52) U.S. Cl. ........................ 707/5; 707/1; 707/2; 707/3; 707/4
(58) Field of Search ...................... 707/1–10, 100–104.1; 709/206

(56) References Cited

U.S. PATENT DOCUMENTS

| | | |
|---|---|---|
| 4,914,586 A | 4/1990 | Swinehart et al. |
| 4,970,681 A | 11/1990 | Bennett |
| 5,051,891 A | 9/1991 | Macphail |
| 5,247,575 A | 9/1993 | Sprague et al. |
| 5,247,661 A | 9/1993 | Hager et al. |
| 5,251,131 A | 10/1993 | Masand et al. |
| 5,251,159 A | 10/1993 | Rowson |
| 5,263,160 A * | 11/1993 | Porter et al. ................... 707/3 |
| 5,276,869 A | 1/1994 | Forrest et al. |
| 5,297,057 A | 3/1994 | Kramer |
| 5,331,579 A | 7/1994 | Maguire |
| 5,333,237 A | 7/1994 | Stefanopoulos et al. |
| 5,428,740 A | 6/1995 | Wood |
| 5,438,526 A | 8/1995 | Itoh |
| 5,473,732 A | 12/1995 | Chang |
| 5,481,741 A | 1/1996 | McKaskle |
| 5,488,725 A | 1/1996 | Turtle |
| 5,493,729 A | 2/1996 | Nigawara et al. |
| 5,513,126 A | 4/1996 | Harkins et al. |
| 5,530,852 A | 6/1996 | Meske, Jr. et al. |
| 5,541,836 A | 7/1996 | Church et al. |
| 5,544,067 A | 8/1996 | Rostoker |
| 5,555,426 A | 9/1996 | Johnson |
| 5,586,218 A | 12/1996 | Allen |
| 5,608,900 A | 3/1997 | Docker et al. |
| 5,628,011 A | 5/1997 | Ahamed et al. |
| 5,659,731 A | 8/1997 | Gustafson |
| 5,659,732 A | 8/1997 | Kirsch |
| 5,692,107 A | 11/1997 | Simoudis et al. |
| 5,704,017 A | 12/1997 | Heckerman et al. |
| 5,717,914 A | 2/1998 | Husick et al. |
| 5,717,923 A | 2/1998 | Dedrick |
| 5,720,001 A | 2/1998 | Nguyen |
| 5,724,567 A | 3/1998 | Rose |
| 5,727,129 A | 3/1998 | Barrett et al. |
| 5,754,938 A | 5/1998 | Herz |

(List continued on next page.)

FOREIGN PATENT DOCUMENTS

WO  WO 9966427 A1 * 12/1999 ........... G06F/17/30

OTHER PUBLICATIONS

"Be Privacy Aware . . . Be Enonymous," Welcome to enonymous.com, Web page, http://www.enonymous.com/default.asp; pp. 1.

(List continued on next page.)

Primary Examiner—Greta Robinson
Assistant Examiner—Linh Black
(74) Attorney, Agent, or Firm—Blakely, Sokoloff, Taylor & Zafman LLP

(57) ABSTRACT

A search is refined, where a user enters a keyword, and a database comprising terms is searched for terms comprising the keyword. Every unique member in the terms is assigned an importance value to produce a set of discriminator members. The discriminator members are presented to the user, and the user may select one or more of the discriminator members to refine the search. If the user selects any keywords, a new keyword is created using the original keyword and the selected discriminator members. A new search is conducted based on the new keyword.

30 Claims, 4 Drawing Sheets

U.S. PATENT DOCUMENTS

| | | | |
|---|---|---|---|
| 5,778,364 A | | 7/1998 | Nelson |
| 5,781,904 A | * | 7/1998 | Oren et al. ................. 707/100 |
| 5,794,210 A | | 8/1998 | Goldhaber |
| 5,802,518 A | | 9/1998 | Karaev |
| 5,812,434 A | | 9/1998 | Nagase |
| 5,835,087 A | | 11/1998 | Herz |
| 5,855,008 A | | 12/1998 | Goldhaber |
| 5,867,799 A | | 2/1999 | Lang |
| 5,892,909 A | | 4/1999 | Grasso et al. |
| 5,913,212 A | | 6/1999 | Sutcliffe |
| 5,931,907 A | | 8/1999 | Davies |
| 5,933,822 A | * | 8/1999 | Braden-Harder et al. ...... 707/5 |
| 5,940,821 A | * | 8/1999 | Wical ............................ 707/3 |
| 5,950,200 A | | 9/1999 | Sudai |
| 5,963,940 A | * | 10/1999 | Liddy et al. .................... 707/5 |
| 5,974,412 A | | 10/1999 | Hazlehurst |
| 5,995,597 A | | 11/1999 | Woltz |
| 5,999,932 A | | 12/1999 | Paul |
| 5,999,975 A | | 12/1999 | Kittaka |
| 6,006,200 A | | 12/1999 | Boies |
| 6,006,221 A | | 12/1999 | Liddy |
| 6,006,225 A | * | 12/1999 | Bowman et al. ................ 707/5 |
| 6,014,644 A | | 1/2000 | Erickson |
| 6,021,439 A | | 2/2000 | Turek |
| 6,026,374 A | | 2/2000 | Chess |
| 6,038,560 A | * | 3/2000 | Wical ............................ 707/5 |
| 6,052,122 A | | 4/2000 | Sutcliffe |
| 6,078,914 A | * | 6/2000 | Redfern ......................... 707/3 |
| 6,128,613 A | * | 10/2000 | Wong et al. .................... 707/7 |
| 6,169,986 B1 | * | 1/2001 | Bowman et al. ................ 707/5 |
| 6,377,949 B1 | * | 4/2002 | Gilmour ...................... 707/10 |
| 6,421,669 B1 | * | 7/2002 | Gilmour et al. ............... 707/9 |
| 6,510,406 B1 | * | 1/2003 | Marchisio ...................... 704/9 |

OTHER PUBLICATIONS

Enonymous web page, "Why be enonymous?" www.enonymous.com/whybeenon.asp, pp. 1.

Enonymous web page, "What is enonymous advisor?" www.enonymous.com/whatisit.asp, pp. 1.

Enonymous web page, "How enonymous advisor beta works . . . " www.enonymous.com/howitworks.asp, pp. 1.

Enonymous web page, "The enonymous zone . . . ," www.enonymous.com/zone.asp, pp. 1.

Enonymous web page, "The enonymous profile," www.enonymous.com/profile.asp, pp. 1.

Enonymous Web Page, "Frequently Asked Questions," www.enonymous.com/FAQ.asp, pp. 1–2.

"Yenta: A multi–agent referral–based matchmaking system," Leonard N. Foner, *The First International Conference on Autonomous Agents (Agents '97)*, Marina Del Rey, CA 1997, pp. 1–7.

"A Multi–Agent Referral System for Matchmaking," Leonard N. Foner, *The First International Conference on the Practical Applications of Intelligent Agents and MultiAgent Technology*, London, UK Apr. 1996., pp. 1–8.

Clustering and Information Sharing in an Ecology of Cooperating Agents, Leonard N. Foner, *AAAI Workshop on Information Gathering in Distributed Heterogeneous Environments '95*, Palo Alto, CA 1995, pp. 1–4.

"Somewhat by topic linearization of Yenta," Leonard N. Foner, www.media.mit.edu/people/foner/yenta/linearization–by–topic.html, pp. 1–51.

"Political Artifacts and Personal Privacy: The Yenta Multi-Agent Distributed Matchmaking system," Leonard N. Foner, Apr. 30, 1999 ©MIT, 1999, pp. 1–128.

"IS Puts Notes to the Test," Datamation, Mark Schlack, vol. 37, No. 15, pp 24–26, Aug. 1, 1991, pp. 24–26.

"Mail–Man: A Knowledge–Based Mail Assistant for Managers," Journal of Organizational Computing, L.F. Motiwalla and JF Nunamaker, Jr. vol. 2, No. 2, pp 131–154, 1992, (Abstract only), pp. 1–2.

"Topic Real–Time," HP–UX–Documentation Disc 50726–10186 (from Software Patent Institute Database of Software Technologies) Feb. 1, 1995.

"askSam for Windows Getting Started Guide," from Software Patent Institute Database of Software Technologies) May 30, 1995, pp. 1–3.

"EZ Reader: Embedded AI for Automatic Electronic Mail Interpretation and Routing," Proceedings of the Thirteenth National Conference on Artificial Intelligence, and the Eighth Innovative Applications of Artificial Intelligence Conference, A. Rice, J. Hsu, A. Angosti and R. Piccolo, vol 2, pp 1507–1517, Aug. 4–8, 1996 (INSPEC Abstract), p. 1.

http://www.email–software.com/pages/00108.htm, review of "Email robot for Exchange/STMP", pp. 1–3.

"Information Management for Knowledge and Amplification in Virtual Enterprises," J. Numata et al. IEMC Proceedings, pp 281–285, Aug. 18–20, 1996 (INSPEC Abstract), pp. 1.

"Knowing What We Know," Justin Hibbard, CPM net Information Week On Line, Oct. 20, 1997, pp. 1–5.

"Knowledge Management: Fuel for Innovation,"Bob Evans, CPM net Information Week On Line, Oct. 20, 1997, pp. 1–2.

"Knowledge Management Evaluation Scenario," Jeff Angus with Jeetu Patel and Joe Fenner, CPM net Information Week On Line, Oct. 20, 1997, pp. 1–3.

"Knowledge Management Takes Industry's Center Stage," Elliot Maise, CMP net Computer Reseller News, Feb. 2, 1998, Issue 774, pp. 1–2.

"Knowledge Management's Net Gain," Kevin Jones, ZDNet Inter@ctive Week, Feb. 24, 1998, pp. 1–2.

"Knowledge Management: Great Concept . . . But What Is It?", Jeff Angus, Jeetu Patel and Jennifer Harty, CMP net, Information Week On Line, Mar. 16, 1998, pp. 1–7.

"Open Sesame Site Just Works," Bill Burke, Business Today.com, http://www.opensesame.com, Today's Column, Jan. 22, 1998.

"New eCommerce and Entertainment Web Site Demonstrates Leading Edge Personalization and Privacy Features" (Press Release), http://www.opensesame.com, Jan. 20, 1998.

"Neural Agent Enables Personalized Surfing," R. Colin Johnson, CMP net TechWeb, http://www.techweb.com, Feb. 4, 1998.

"Life Span vs. Life Spam," George Gilder, Forbes ASAP, http://www.forbes.com/asap, Apr. 6, 1998.

"Learn Sesame get more personal," Jim Rapoza, PC Week Online, http://www.zdnet.com/pcweek/reviews, Mar. 18, 1998.

"Natrificial Software Technologies Introduces the Brain" (Press Release), Natrificial Software Technologies, http://www.natrificial.com, Jan. 28, 1998.

"The Brain: Much More The Way You Think," Scot Finnie, CMP Net Windows Magazine, http://www.windowsmagazine.com, May 1, 1998.

"What's New," Natrificial Software Technologies, http://www.natrificial.com, 1998, pp. 1.

"Natrificial Software Technologies," Natrificial Software Technologies, http://www.natrificial.com, Jan. 28, 1998, pp. 1.

"Always Thinking Ahead", Natrificial Software Technologies, http://www.natrificial.com, pp. 1.

"Digitize Your Mind", Natrificial Software Technologies, http://www.natrificial.com, pp. 1.

"It's your thought that counts", Natrificial Software Technologies, http://www.natrificial.com, pp. 1.

"Knowledge Is Power", Natrificial Software Technologies, http://www.natrificial.com, pp. 1.

"Free Your Mind", Natrificial Software Technologies, http://www.natrificial.com, The Brain Press Reviews:, Natrificial Software Technologies, http://www.natrificial.com, pp. 1.

"Abuzz's Mission," Abuzz, http://www.abuzz.com, pp. 1.

"Beehive", Abuzz, http://www.abuzz.com/home/Beehive.htm, pp. 1.

"Beehive: Beta Program", Abuzz, http://www.abuzz.com/home/demos.htm., pp. 1–2.

"Beehive: White Papers", Abuzz, http://www.abuzz.com/home/white_papers.htm; pp. 1–4.

Open Sesame, http:www.opensesame.com, pp. 1.

Open Sesame: The Company,, http:www.opensesame.com/company.htm, pp. 1–2.

Open Sesame Published Papers, http:www.opensesame.com/co_02.html, pp. 1–2.

Open Sesame: Products: Benefits, http:www.opensesame.com/prod_02.html, pp. 1–2.

Open Sesame: Products: Product Datasheet, http:www.opensesame.com/prod_04.html, pp. 1–3.

Open Sesame: Products: Demos, http:www.opensesame.com/prod_05.html, pp. 1.

Open Sesame: Products: eGenie Live!, http:www.opensesame.com/prod_06.html, pp. 1–2.

Open Sesame: Commitment to Privacy, http:www.opensesame.com/privacy.html, pp. 1–2.

Open Sesame: Press,, http:www.opensesame.com/press.cfm, pp. 1–2.

Autonomy Knowledge Management Products, http://www.agentware.com, pp. 1.

Autonomy Latest News, Autonomy Home Page, http://www.agentware.com, pp. 1.

Autonomy Knowledge Server Data Sheet, http://www.agentware.com, pp. 1–3.

Autonomy Knowledge Update Datasheet, http://www.agentware.com, pp. 1–2.

The Technology Behind Autonomy Agentware, Autonomy Technology Page, http://www.agentware.com, pp. 1–2.

Autonomy Agentware Technology White Paper, http://www.agentware.com, pp. 1–9.

"Autonomy Launches New Knowledge Management Products to Help Companies Leverage Employee Expertise", Late–Breaking News and Existing Information Archives, pp. 1–2.

"Autonomy Ships Agentware Products for Knowledge Management", Autonomy Press Release, Apr. 14, 1998, pp. 1–2.

"A Short Introduction to Nptool", Atro Voutilainen, A Short Introduction to Nptool, http://www.lingsoft.fi/doc/nptool/intro/html, pp. 1–5.

Nptool Intro: Overview, http://www.lingsoft.fi/doc/nptool/intro/overview/html, pp. 1–3.

Nptool Intro: Nptool in Oultline http://www.lingsoft.fi/doc/nptool/intro/outline/html, pp. 1–6.

Orbital Technologies: About Orbital Technologies, http://www.orbitalsw.com/about.html, pp. 1.

Orbital Technologies: Orbital Products, http://www.orbital–tech.com/products.html, pp. 1–2.

Orbital Technologies: Organik KnowledgeWare, http://www.orbitalsw.com/organikkw.html, pp. 1–3.

Orbital Technologies: Organik Persona Server, http://www.orbitalsw.com/organikps.html, pp. 1–2.

Orbital Technologies: Corporate Fact Sheet, Jan. 1998, http://www.orbitalsw.com, pp. 1–2.

Orbital Technologies: Orbital Organik White Paper, http://www.orbitalsw.com, pp. 1–7.

Security Policy Model for Clinical Information Systems Anderson, R.J., pp 30–43, Security and Privacy '96, Proceeding IEEE Symposium, May 6–8, 1996, pp. 30–43.

"Taking the Byte out of Cookies: Privacy, consent and the Web" Daniel Lin and Michael C Loui, pp 39–51 Proceeding of the ethics and social impact component on Shaping policy on the information age, May 10–12, 1998, pp. 39–51.

"Verity Introduces new Profiler Kit and enhanced developer's Kit" AIC Newsletter Collection—M2 Presswire—Aug. 1998, pp. 1–4.

"Integrators' Choice Awards" Brambert, Dave and Biangi, Susan—Network VAR V5.n10 p28, Oct. 1997, pp. 1–4.

Applying Evolutionary algorithms to the problems of information filtering, Tjoa, A.M., Hofferer, M, Ehrentraut, G, Untersmeyer, P. Institute of Software Technology, Vienna, Austria, Database and Expert Systems Applications, 1997, 8th International Workshop., pp. 450–458.

Natrificial Software Technologies Unveils Internet Brian Publishing, Jun. 1998 Press Release, http://www.Natrificial.com/Company/press_01.html (Now thebrain.com), pp. 1–4.

* cited by examiner

RENDERING DISCRIMINATOR MEMBERS FROM AN INITIAL SET OF RESULT DATA

FIELD OF THE INVENTION

This invention relates generally to the field of knowledge management and more particularly to a method for refining a search of a database.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999, Tacit Knowledge Systems, Inc., All Rights Reserved.

BACKGROUND OF THE INVENTION

The new field of "knowledge management" (KM) is receiving increasing recognition as the gains to be realized from the systematic effort to store and export vast knowledge resources held by employees of an organization are being recognized. The sharing of knowledge broadly within an organization offers numerous potential benefits to an organization through the awareness and reuse of existing knowledge, and the avoidance of duplicate efforts.

In order to maximize the exploitation of knowledge resources within an organization, a knowledge management system may be presented with two primary challenges, namely (1) the identification of knowledge resources within the organization and (2) the distribution and accessing of information regarding such knowledge resources within the organization.

The identification, capture, organization and storage of knowledge resources is a particularly taxing problem. Prior art knowledge management systems have typically implemented knowledge repositories that require users manually to input information frequently into pre-defined fields, and in this way manually and in a prompted manner to reveal their personal knowledge base. However, this approach suffers from a number of drawbacks in that the manual entering of such information is time consuming and often incomplete, and therefore places a burden on users who then experience the inconvenience and cost of a corporate knowledge management initiative long before any direct benefit is experienced. Furthermore, users may not be motivated to describe their own knowledge and to contribute documents on an ongoing basis that would subsequently be re-used by others without their awareness or consent. The manual input of such information places a burden on users who then experience the inconvenience and cost of a corporate knowledge management initiative long before any direct benefit is experienced.

It has been the experience of many corporations that knowledge management systems, after some initial success, may fail because either compliance (i.e., the thoroughness and continuity with which each user contributes knowledge) or participation (i.e., the percentage of users actively contributing to the knowledge management system) falls to inadequate levels. Without high compliance and participation, it becomes a practical impossibility to maintain a sufficiently current and complete inventory of the knowledge of all users. Under these circumstances, the knowledge management effort may never offer an attractive relationship of benefits to costs for the organization as a whole, reach a critical mass, and the original benefit of knowledge management falls apart or is marginalized to a small group.

In order to address the problems associated with the manual input of knowledge information, more sophisticated prior art knowledge management initiatives may presume the existence of a centralized staff to work with users to capture knowledge bases. This may however increase the ongoing cost of knowledge management and requires a larger up-front investment before any visible payoff, thus deterring the initial funding of many an otherwise promising knowledge management initiatives. Even if an initial decision is made to proceed with such a sophisticated knowledge management initiative, the cash expenses associated with a large centralized knowledge capture staff may be liable to come under attack, given the difficulty of quantifying knowledge management benefits in dollar terms.

As alluded to above, even once a satisfactory knowledge management information base has been established, the practical utilization thereof to achieve maximum potential benefit may be challenging. Specifically, ensuring that the captured information is readily organized, available, and accessible as appropriate throughout the organization may be problematic.

SUMMARY OF THE INVENTION

In one aspect of the invention, a method for refining a search is described. A keyword is received, and a database comprising terms, where each term comprises one or more members, is accessed. Associated terms in the database are found, where associated terms comprise the keyword. A set of discriminator members is created, where each discriminator member comprises a member of one or more of the associated terms and a corresponding importance metric. The set of discriminator members are created by extracting all members from the terms in the database and creating a set of members unique from each other. An importance value is determined for each unique member, and then the discriminator members are returned.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
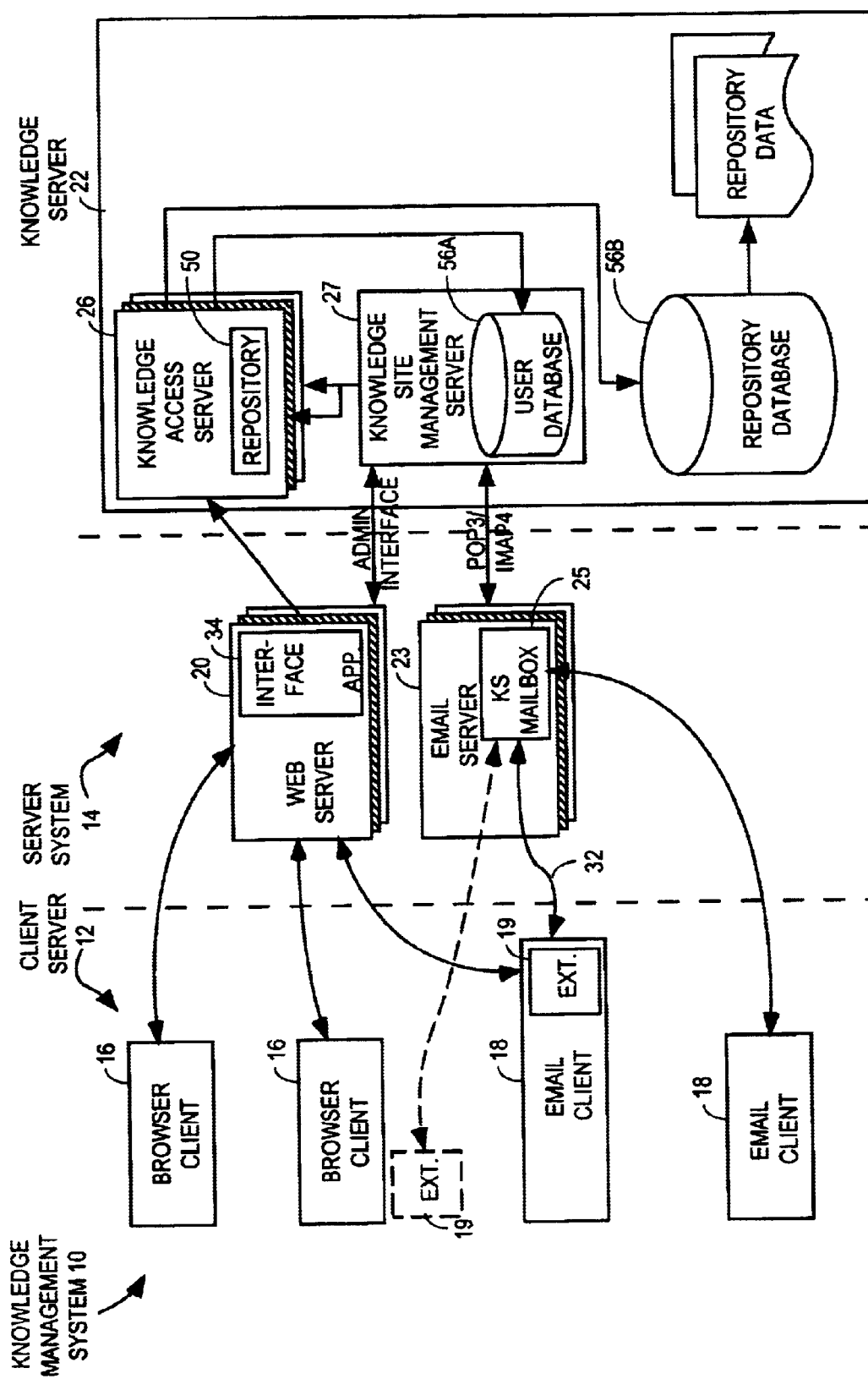
FIG. 1 is a block diagram illustrating a knowledge management system, according to an exemplary embodiment of the present invention.

FIG. 1 is a block diagram illustrating an exemplary embodiment of a knowledge management system 10 that intercepts electronic documents, extracts terms therefrom that are potentially indicative of a knowledge base of a user, and distributes a user knowledge profile constructed from the extracted "knowledge" terms. For the purposes of the present application, the word "term" and phrase "knowledge term" shall be taken to include any acronym, word, collection of words, phrase, sentence, or paragraph.

The grammatical structure, length, frequency and density with which the extracted knowledge terms occur within the electronic documents, and prior history of use of the extracted knowledge terms within an organization may furthermore be utilized to attach a metric, in the form of a confidence level value, to the relevant knowledge terms for the purpose of grouping, ranking, and prioritizing such knowledge terms. For the purposes of the present application, the term "confidence level" shall be taken to mean any indication, numeric or otherwise, of a level within a predetermined range.

Knowledge terms may furthermore be stored in either a private or public portion of the user knowledge profile, depending upon the confidence level values thereof. With a view to determining which terms are truly indicative of a knowledge base, a number of rules (or algorithms) may be exercised with respect to extracted terms to identify terms that are candidates for inclusion within a public portion of the user knowledge profile. Further rules (or algorithms) may be applied to an assembled knowledge profile for the purpose of continually organizing and refining the profile. Alternatively, the contents of a user's knowledge profile may be periodically reviewed by the user ("owner") to organize the public and private portions according to user preferences.

User control over the content of the private and public portions of the user's knowledge profile enhance the privacy of the system, protecting electronic documents from unwanted intrusion by others, including searchers. Unrestricted access to the public portion of the user knowledge profile may be provided to other users, for instance those in a particular organization. The private portion of a user knowledge profile may, on the other hand, have a restricted access and may require specific authorization by the owner for the provision of information concerning the user knowledge profile, and the owner, in response to a specific request.

The knowledge management system 10 may conveniently be viewed as comprising a client system 12 and a server system 14. Client system 12 includes clients with access to the server system 14, such as Internet browser clients 16 or e-mail clients 18, which may be resident on machines within the knowledge management system 10 or coupled to it through a computer network. Extensions 19 are incorporated into an e-mail client 18 to enable it to send electronic messages to a knowledge server 22. In particular, e-mail messages are copied to a special e-mail address 25 maintained by an e-mail server 23 that is associated with the knowledge server 22 (illustrated as arrow 32). As shown in FIG. 1, the extensions 19 may be integral with an e-mail client 18, or external to the client 18 and in communication therewith. Alternatively, the user of an e-mail client 18 may manually address an email to the e-mail address 25, or e-mails from the client system 12 may be intercepted by the first server through which the e-mails pass and forwarded onto the knowledge server 22, thus eliminating the need for the extensions 19. The browser clients 16 provide an additional means to submit documents to the knowledge server 22 through an interface application 34 maintained on a web server 20.

The server system 14 of the system 10 includes the web server 20, the e-mail server 23 and the knowledge server 22, although the invention is not so limited. The components of the knowledge server 22 illustrated in FIG. 1 are collectively responsible for examining and processing electronic documents received on the server system 14 from various sources, including the email server 23 and the web server 20. Servers for other text-based applications used in the organization also may be considered part of the server system 14 and are interfaced into the knowledge server 22 through gateways (not shown). It will be further appreciated that alternate means of submitting electronic documents to the knowledge server 22, such as the implementation of standard application program interfaces (APIs), are contemplated as within the scope of the invention.

The knowledge server 22 includes a knowledge site management server (KSMS) 27 and a knowledge access server (KAS) 26. The KAS 26 provides a local, logical view of a knowledge repository 50, which is physically stored in a user database 56A and a repository database 56B. Once extracted from the electronic documents, knowledge terms may be processed so as to associate them with other knowledge terms within the repository 50 and to create or update knowledge profiles. Both databases 56A, 56B may store knowledge terms, as well as other data pertaining to users, the system, passwords, etc., in codes or other encrypted form that are only meaningful when accessed through the interfaces offered by system 10 to enhance privacy. The KSMS 27 is given access to the local view of the knowledge repository 50 maintained by the KAS 26. It will be appreciated that although the user database 56A and the repository database 56B are illustrated as separate databases in FIG. 1, other physical and/or logical arrangements of the databases 56A, 56B and the corresponding knowledge repository 50 are equally applicable to the present invention.

The web server 20 facilitates access to the local view of the knowledge repository 50 by the browser clients 16 through the web server interface application 34. The web server 20 also facilitates knowledge profile queries, e-mail addressing based on knowledge profiles, and other types of access to the knowledge server 22.

Further details of the knowledge management system 10 and the creation and use of knowledge profiles are given in U.S. Pat. No. 6,115,709 entitled METHOD AND SYSTEM FOR CONSTRUCTING A KNOWLEDGE PROFILE OF A USER HAVING UNRESTRICTED AND RESTRICTED ACCESS PORTIONS ACCORDING TO LEVELS OF CONFIDENCE OF THE CONTENT OF THE PORTIONS, issued on Sep. 5, 2000 and assigned to the assignee of the present application, and which is hereby incorporated by reference.

OVERVIEW

Knowledge profiles in the knowledge server 22 can be accessed through knowledge profile queries. In one embodiment, a document search is performed, where a user submits an electronic document, and extracted terms are used as search criteria for accessing a knowledge profile. This use is discussed further in U.S. patent application Ser. No. 09/270,974 entitled "METHOD AND APPARATUS FOR QUERYING A USER KNOWLEDGE PROFILE". In another embodiment, a keyword search is performed, where a user submits search criteria for accessing a knowledge profile.

Figure 2:
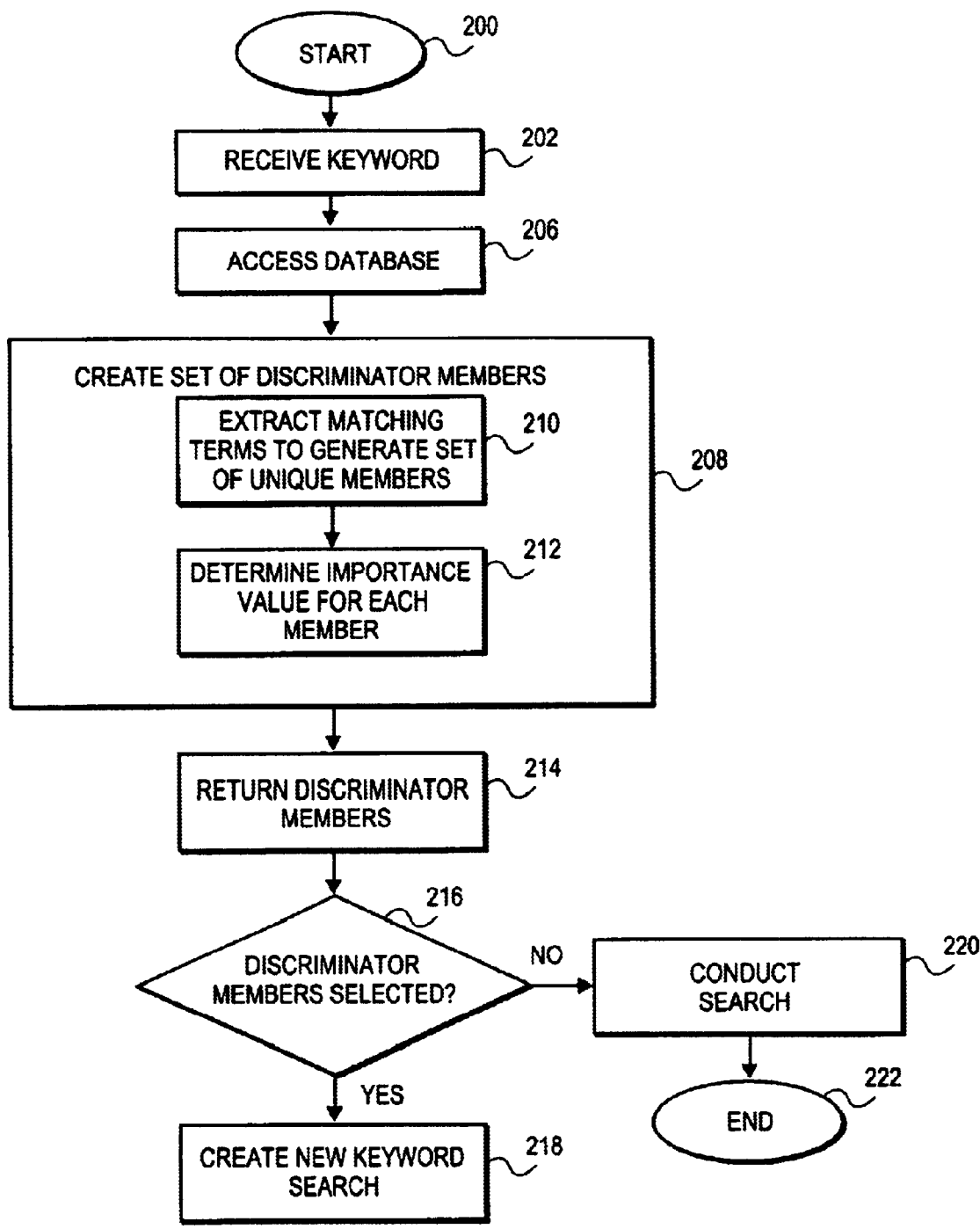
FIG. 2 is a flowchart illustrating a method, according to an exemplary embodiment of the invention, of refining a search.

A method for refining a search in accordance with the present invention is illustrated in FIG. 2. The method 200 commences at block 202 and proceeds to block 204, where a search comprising a keyword is received. At block 206, a database is accessed, which in preferred embodiments comprises the repository 50 comprising knowledge terms. At block 208, a set of discriminator members, each discriminator member including a member of one or more terms and a corresponding importance value, is created by extracting all members of associated terms in the database and generating a set of members unique from each other in block 210, and then by determining an importance value for each member at block 212. The discriminator members are then returned (for example, displayed) at block 214. At block 216, it is determined if any of the returned discriminator members is selected. If they are selected, then a new keyword search criteria comprising the first keyword and the one or more selected discriminator members, is created at block 218, and the method 200 proceeds to block 202. If no discriminator members are selected, then a search is conducted using the first keyword 220. The method 200 terminates at block 222.

As used throughout this description, a keyword comprises search criteria. A keyword may be, for example, single words, parenthetical words, exact phrases, or any combination thereof, joined by an arbitrary set of Boolean logic. In this respect, a keyword may comprise members, where a member may be a single word, a parenthetical word, or a phrase, for example.

Determining Discriminator Members of a Term

Figure 3:
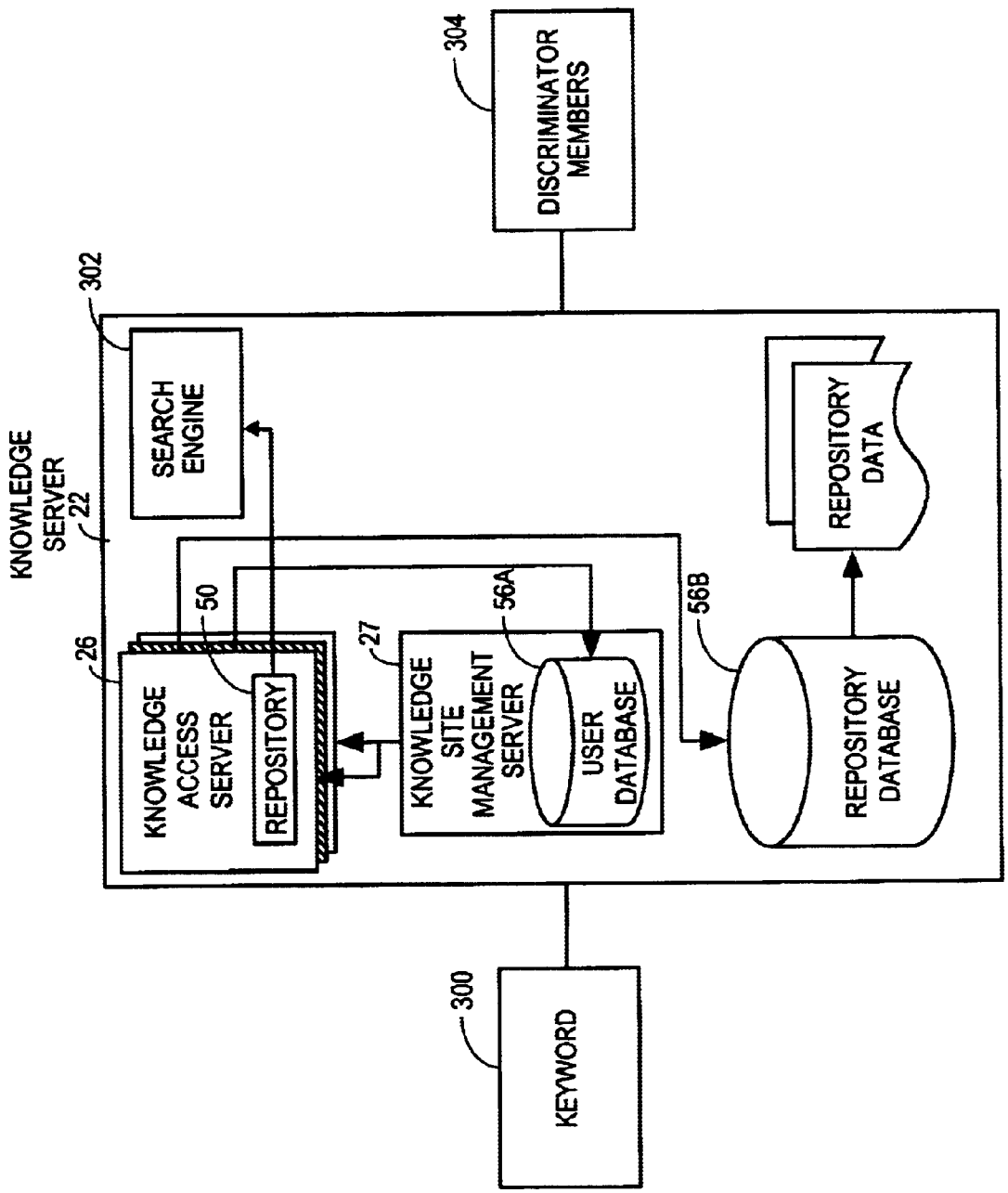
FIG. 3 is a block diagram a search engine of the present invention, according to an exemplary embodiment of the present invention, as implemented in a knowledge management system.

FIG. 3 is a block diagram illustrating a search engine in accordance with an exemplary embodiment of the present invention. A keyword 300 is received by the knowledge server 22. A search engine 302 processes the keyword 300. Through the knowledge access server 26, the search engine 302 accesses the repository 50 and looks for associated terms, or terms that comprise the keyword 300. Thus, a matching keyword may comprise more members than the keyword itself, or it may exactly match the keyword. Members of a term include acronyms, words, collections of words, phrases, sentences, or paragraphs, for example, as discussed previously. If associated terms are found, then the importance of each unique member of the associated terms is determined, and each unique member is assigned a corresponding importance value. Preferably, the importance value of a member of an associated term that is a keyword is not determined, but may be used to determine the importance value of the other members.

In embodiments of the invention, a list of search results may be presented prior to refining the search. In this case, the user is subsequently presented with an option to further refine the search. Furthermore, as each term is associated with a knowledge profile and a particular user, terms can be categorized by user, where each user is associated with a set of associated terms.

The importance value of a member of an associated term may be derived from any number of metrics, including the number of terms in which the member occurs; the value of the terms in which the member appears; and the value of the member itself within each of the terms. The number of terms in which the member occurs and the value of the terms in which the member appears are both metrics used in determining confidence level values, as discussed in U.S. Pat. No. 6,115,79, supra. In one embodiment, the metrics are based upon all terms in the database. In another embodiment, the metrics are based upon associated terms.

The value of a member itself within each of the terms can be determined using metrics, such as a predetermined weight assigned to the part of speech of a given member in an associated term; a predetermined weight assigned to the part of speech of the other members in the associated term; and the total number of members in the associated term. In preferred embodiments, all three metrics are used to calculate an importance value for a given member. Thus, for example, where a term comprises three members including a noun, verb, and adjective, in decreasing order of predetermined weights, a member that is a noun is more important than a member that is a verb.

Also in preferred embodiments, all three metrics are used to calculate an importance value for a member of a term. Thus, for example, each metric is determined, and all three are summed, or averaged, for example, to calculate an importance value for a member. However, it should be apparent to one of ordinary skill in the art that other factors may be used, and any combination of these factors and/or other factors may be used, including single factors, such as frequency. The set of discriminator members includes all unique members and their corresponding importance values.

The search engine then returns the discriminator members 304, which can then be displayed to the originating user. In preferred embodiments, any members of a keyword which appear in a discriminator member are stripped from the discriminator members before the discriminator members are returned, or before a set of discriminator members is created.

Refining A Search

Once the user is presented with a list of discriminator members, the user can select one or more of the discriminator members to refine the user's original search. The user may be presented with a list of Boolean operators from which the user can select from. If the user does not select any Boolean operators, or if no Boolean operators are presented in a given implementation, then a default Boolean operator, such as "AND" may be used.

If any discriminator members are selected, they are added to the user's original search, and the search is conducted as described above, allowing the user to further refine the search. If no discriminator members are selected, then the user may select one of the search results returned.

EXAMPLE

If the user enters the keyword "COMPUTER", for example, the search engine 300 searches the repository 50 for all associated terms, i.e., terms comprising the keyword "COMPUTER". For example, associated terms may comprise "COMPUTER KNOWLEDGE SYSTEMS", "COMPUTER TECHNICAL SUPPORT WEB SITE", "1999

COMPUTER KNOWLEDGE SYSTEMS CHICAGO", and "COMPUTER APPLICATION SERVER".

Each associated term is evaluated to determine an importance value for each member in the associated term. In accordance with the method described above, for example, an importance factor is computed for each member in the associated term "COMPUTER KNOWLEDGE SYSTEMS" (excluding the keyword "COMPUTER", in preferred embodiments) by determining an importance value for "KNOWLEDGE":

the number of terms in which "KNOWLEDGE" occurs the value of terms in which "KNOWLEDGE" appears the value of "KNOWLEDGE" within each of the terms and by determining an importance value for "SYSTEMS"

the number of terms in which "SYSTEMS" occurs the value of terms in which "SYSTEMS" appears the value of "SYSTEMS" within each of the terms Thus, in the condensed list of terms comprising "COMPUTER" shown above, "KNOWLEDGE" and "SYSTEMS" each occur twice. To determine the value of the terms in which each member appears, a confidence level value for each term comprising the member (i.e., terms comprising "KNOWLEDGE" and terms comprising "SYSTEMS") is determined as described in U.S. Pat. No. 6,115,709.

The importance value of the member "KNOWLEDGE" is determined by finding all terms (or in all associated terms) comprising the member "KNOWLEDGE" (i.e., "COMPUTER KNOWLEDGE SYSTEMS", "1999 COMPUTER KNOWLEDGE SYSTEMS CHICAGO"), and determining an importance value for the member in each of those terms. Likewise, the importance value of the member "SYSTEMS" is determined by finding all terms comprising the member "SYSTEMS" (i.e., "COMPUTER KNOWLEDGE SYSTEMS", "1999 COMPUTER KNOWLEDGE SYSTEMS CHICAGO") and determining an importance factor for the member in each of those terms.

The values found for each of the factors can then be summed up, or averaged, for instance, to determine an importance factor for each member to generate discriminator members. Preferably, the discriminator members are ordered by their importance. In one example, all discriminator members may be displayed in decreasing order of frequency by percentage.

Once presented, the user can select one or more of the discriminator members to further refine the search. Thus, if the user selects the discriminator member "KNOWLEDGE", it is appended to the original keyword "COMPUTER" to produce the new keyword search criteria "COMPUTER" & "KNOWLEDGE". A user may be presented with a list of Boolean values to choose from, or the Boolean value may automatically default.

A new search is conducted using the new keyword, and only terms comprising both members of this keyword are returned.

COMPUTER SYSTEM

Figure 4:
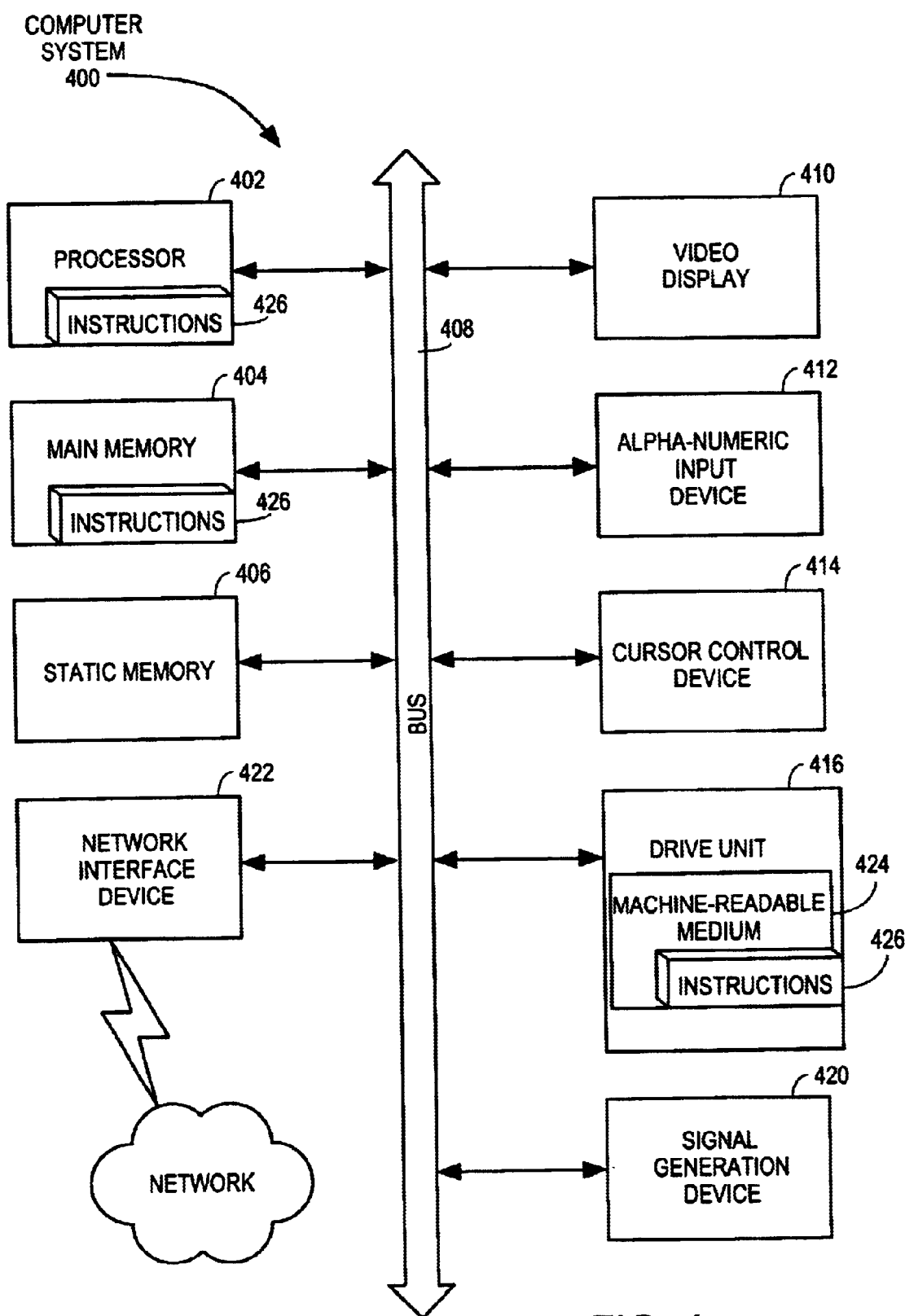
FIG. 4 is a diagram of one embodiment of a computer system suitable for performing any one of the methods discussed above.

FIG. 4 is a diagrammatic representation of machine in the form of a computer system 400 within which software, in the form of a series of machine-readable instructions, for performing any one of the methods discussed above may be executed. The computer system 400 includes a processor 402, a main memory 404 and a static memory 406, which communicate via a bus 408. The computer system 400 is further shown to include a video display unit 410 (e.g., a liquid crystal display (LCD) or a cathode ray tube (CRT)).

The computer system 400 also includes an alphanumeric input device 412 (e.g., a keyboard), a cursor control device 414 (e.g., a mouse), a disk drive unit 416, a signal generation device 420 (e.g., a speaker) and a network interface device 422. The disk drive unit 416 accommodates a machine-readable medium 424 on which software 426 embodying any one of the methods described above is stored. The software 426 is shown to also reside, completely or at least partially, within the main memory 404 and/or within the processor 402. The software 426 may furthermore be transmitted or received by the network interface device 422. For the purposes of the present specification, the term "machine-readable medium" shall be taken to include any medium that is capable of storing or encoding a sequence of instructions for execution by a machine, such as the computer system 400, and that causes the machine to perform the methods of the present invention. The term "machine-readable medium" shall be taken to include, but not limited to, solid-state memories, optical and magnetic disks, and carrier wave signals.

If written in a programming language conforming to a recognized standard, the software 426 can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one from or another (e.g., program, procedure, process, application, module, logic . . . ), as taking an action or causing a result. Such expressions are merely a shorthand way of saying that execution of the software by a machine, such as the computer system 400, the machine to perform an action or a produce a result.

The preceding description of FIG. 4 is intended to provide an overview of computer hardware and other operating components suitable for implementing the invention, but is not intended to limit the applicable environments. One of skill in the art will immediately appreciate that the invention can be practiced with computer architectures and configurations other than that shown in FIG. 4, including hand-held devices, multiprocessor systems, microprocessor-based or programmable consumer electronics, network PCs, minicomputers, mainframe computers, and the like. A typical computer system will usually include at least a processor, memory, and a bus coupling the memory to the processor. The invention can also be practiced in distributed computing environments where tasks are performed by remote processing devices that are linked through a communications network.

A search refinement tool has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that a repository comprising knowledge profiles as discussed herein may be, generally, any database comprising terms. Furthermore, those of ordinary skill within the art will appreciate many other factors not discussed herein may be used to determine values and/or importance factors for a term or a member of a term. Therefore, it is manifestly intended that this invention be limited only by the following claims and equivalents thereof.

What is claimed is:

1. A method to refine a search, comprising:

receiving a keyword;

accessing a database comprising terms, each term comprising one or more members;

finding associated terms in the database, the associated terms comprising the keyword;

creating a set of discriminator members, each discriminator member comprising a member of one or more of the associated terms and a corresponding importance value, said creating comprising:

extracting all members from the terms in the database and creating a set of members unique from each other; and determining an importance value for each unique member; and returning the discriminator members.

2. A method as in claim 1, wherein said determining of the importance value of a unique member comprises any one or more of the following:

determining the number of terms in which the unique member occurs;

determining the value of the term in which the unique member occurs; and determining the value of the unique member in each of the terms.

3. A method as in claim 2, wherein the terms comprise associated terms.

4. A method as in claim 2, wherein said determining the value of the term in which the member occurs comprises determining a confidence level of the term in which the member occurs.

5. A method as in claim 2, wherein said determining of the importance value of the member in each of the terms comprises any one or more of the following:

determining a weight assigned to the part of speech of the member in the term;

determining a weight assigned to the part of speech of the other members in the term; and determining a total number of members in the term.

6. A method as in claim 1, wherein said returning the discriminator members comprises displaying the discriminator members.

7. A method as in claim 6, wherein said displaying the discriminator members comprises displaying the discriminator members in an order of importance.

8. A method as in claim 7, wherein said displaying the discriminator members in the order of importance comprises displaying the discriminator members in an order of decreasing frequency.

9. A method as in claim 1, additionally comprising removing from any discriminator members those members that match the keyword prior to returning the discriminator members.

10. A method as in claim 1, additionally comprising removing from any discriminator members those members that match the keyword prior to creating a set of discriminator members.

11. A method to refine a search, comprising:

receiving a request to conduct a first search using a keyword;

accessing a database comprising terms, each term comprising one or more members;

finding associated terms in the database, the associated terms comprising the keyword;

returning the associated terms;

receiving a request to refine the first search;

creating a set of discriminator members, each discriminator member comprising a member of one or more of the associated terms and a corresponding importance value, said creating comprising:

extracting members from the database and creating a unique set of members; and determining an importance value for each unique member; and returning the discriminator members.

12. A method as in claim 11, additionally comprising:

receiving one or more selected discriminator members; and generating a second search using the keyword in conjunction with the one or more selected discriminator members.

13. A method as in claim 11, wherein said determining the importance of a given member comprises any one or more of the following:

determining a number of terms in which the member occurs;

determining a value of the term in which the member occurs; and determining a value of the member in each of the terms.

14. A method as in claim 13, wherein said determining of the value of the term in which the member occurs comprises determining a confidence level of the term in which the member occurs.

15. A method as in claim 13, wherein said determining of the value of the member in each of the terms comprises any one or more of the following:

determining a weight assigned to a part of speech of the member in the term;

determining a weight assigned to a part of speech of the other members in the term; and determining a total number of members in the term.

16. A method as in claim 13, wherein said determining of the value of the term in which the member occurs comprises determining a confidence level of the term in which the member occurs.

17. A system to refine a search, comprising:

a database comprising terms, each term comprising one or more members;

a search engine to process a keyword to conduct a first search of a database, the search engine to create a set of discriminator members by:

extracting terms from the database that are associated terms;

determining an importance value for each unique member of every term in the database; and returning the discriminator members.

18. A system as in claim 17, the search engine additionally to:

receive a request to conduct a second search;

receive one or more selected discriminator members; and conduct the second search using the keyword in conjunction with the selected discriminator members.

19. A machine-readable medium having stored thereon data representing sequences of instructions, the sequences of instructions which, when executed by a processor, cause the processor to perform the following:

receive a keyword;

access a database comprising terms, each term comprising one or more members;

find associated terms in the database, the associated terms comprising the keyword;

create a set of discriminator members, each discriminator member comprising a member of one or more of the associated terms and a corresponding importance value, said creating comprising:

extracting all members from the terms in the database and creating a set of members unique from each other; and determining an importance value for each unique member; and returning the discriminator members.

20. A medium as in claim 19, wherein said determining of the importance value of a unique member comprises any one or more of the following:

determining a number of terms in which the unique member occurs;

determining a value of the term in which the unique member occurs; and determining a value of the unique member in each of the terms.

21. A medium as in claim 20, wherein the terms comprise associated terms.

22. A medium as in claim 20, wherein said determining the value of the term in which the member occurs comprises determining the confidence level of the term in which the member occurs.

23. A medium as in claim 20, wherein said determining the value of the member in each of the terms comprises any one or more of the following:

determining the weight assigned to the part of speech of the member in the term;

determining the weight assigned to the part of speech of the other members in the term; and determining the total number of members in the term.

24. A medium as in claim 19, wherein said returning the discriminator members comprises displaying the discriminator members.

25. A method comprising:

identifying associated terms in a database, the associated terms comprising one or more term members, wherein the associated terms include a received keyword;

determining an importance value for each unique term member of the identified associated terms and assigning the importance value to each unique term member; and creating discriminator terms, each discriminator term including one more unique term members of the associated terms and corresponding importance value for each unique term member of the associated terms.

26. The method of claim 25, wherein the determining of the importance value for each unique member comprises one or more of the following:

determining the number of terms in which the unique member occurs;

determining the value of the term in which the unique member occurs; and determining the value of the unique member in each of the terms.

27. The method of claim 25, wherein the determining of the importance value for each member in each of the terms comprises one or more of the following:

determining a weight assigned to the part of speech of the member in the term;

determining a weight assigned to the part of speech of the other members in the term; and determining a total number of members in the term.

28. The method of claim 25 further comprising displaying discriminator members to a user.

29. The method of claim 28 wherein the displaying the discriminator members comprises displaying the discriminator members in an order of importance.

30. The method of claim 28 further comprising removing from discriminator members those members that match the keyword prior to displaying the discriminator members to a user.

* * * * *